INVENTOR
C. W. FARROW
BY [signature]
ATTORNEY

INVENTOR
C. W. FARROW
BY [signature]
ATTORNEY

INVENTOR
C. W. FARROW.
BY [signature]
ATTORNEY 3,063,021

OSCILLATOR SYNCHRONIZING SYSTEM

Cecil W. Farrow, Clifton, N.J., assignor to Bell Telephone Laboratories, Incorporated, New York, N.Y., a corporation of New York Filed Feb. 8, 1961, Ser. No. 87,819
13 Claims. (Cl. 331—10)

This invention relates to oscillator circuits and more particularly to circuits for synchronizing the output of an oscillator with a reference signal. Its principal object is to improve the accuracy and stability of such circuits.

In the communications field and in related arts various applications of oscillator circuits include a requirement for synchronizing the output of an oscillator with a reference signal. The receiving terminal of a digital data transmission system, for example, must have a source of timing information that is precisely synchronized with the transmitting clock to permit efficient extraction of information from the digital signal. Electromechanical resonators such as crystals or tuning fork oscillators are commonly used in such systems because of their good frequency stability and inherently high Q. Heretofore, however, the potential accuracy of oscillators of this type has not been fully realized because of a lack of corresponding accuracy and stability in synchronizing systems.

The problem of synchronizing an oscillator with a reference signal is, in fact, a dual problem in that it involves bringing signals into coincidence in both frequency and phase. At a particular instant in time in a given system a lack of coincidence between two signals may be the result of a phase difference only. Typically, however, a lack of coincidence is the result of some combination of errors in both frequency and phase. In general, prior art systems attempt to achieve synchronism by applying separate frequency and phase corrections or combined frequency and phase corrections without regard to the possibility of applying a combination of the corrections in selective proportion corresponding to the need for each correction.

The problem is somewhat analogous to that of regulating the time of a clock. When a clock is in error, it may be corrected by moving the hands or by changing the rate or by a combination of the two. If the time error is solely the result of some temporary effect, a setting of the hands is the only correction required. More generally, some particular significant proportion of each of the corrections must be applied to achieve any degree of lasting accuracy. In any event, the use of the wrong correction or an improper combination of the two corrections creates a need for still further compensating corrections. The end result, whether such corrections are to the rate and setting of a clock or to the frequency and phase of an oscillator, is to establish a hunting condition in the synchronizing system with attendant instability and loss of control accuracy.

Accordingly, a specific object of the invention is to reduce hunting in oscillator synchronizing systems.

Another object is to increase the speed with which an oscillator may be brought into synchronism with a reference signal.

A further object is to reduce the dependency of the phase of the output of an oscillator system upon changes in the frequency of the oscillator.

These and other objects are achieved in accordance with the principles of the invention by an arrangement which uniquely combines both frequency and phase control by providing means for selectively applying a predetermined proportion of each correction. Corrections to the frequency are made by changing the frequency of oscillations. At the same time, however, the phase of the final output signal of the oscillator system may be changed directly and abruptly even before the frequency change has had time to take effect.

In an illustrative embodiment of the invention comprising a tuning fork oscillator synchronizing system an auxiliary feedback path is employed to combine signals of variable magnitude in quadrature phase relation with the primary feedback signal to control the frequency of oscillations. The final output signal of the system is a combination of preselected proportions of the two feedback signals. Circuitry responsive to a phase difference between a reference signal and the oscillator's final output is employed to control the magnitude of the signal in the auxiliary feedback path and to control the direction of the quadrature relation between the two feedback signals. It is in this way that abrupt changes in the phase of the final output signal can be made substantially independent of changes in oscillator frequency.

A feature of the invention is the dual employment of an auxiliary feedback signal in quadrature phase relation to the primary feedback signal in an electromechanical oscillator circuit for changing the frequency of the oscillator and for independently changing the phase of a final output signal.

A further feature of the invention is a means for combining preselected proportions of an auxiliary feedback signal and a primary feedback signal in quadrature phase relation to control the phase of the output signal of an oscillator system.

Another feature of the invention is a means responsive to a difference in phase between a reference signal and the output of a control oscillator for enabling an auxiliary feedback path in a tuning fork oscillator, in combination with a circuit for applying the vector sum of the two feedback signals to drive the oscillator and an additional circuit for applying preselected proportions of each of the two feedback signals to control the phase of the output of the oscillator system.

The principles of the invention and additional objects and features thereof will be fully apprehended by considering the following detailed description of an illustrative embodiment of the invention together with the appended drawing.

In the drawing, FIG. 1 is a block diagram of an oscillator synchronizing system in accordance with the invention;

Figure 1:
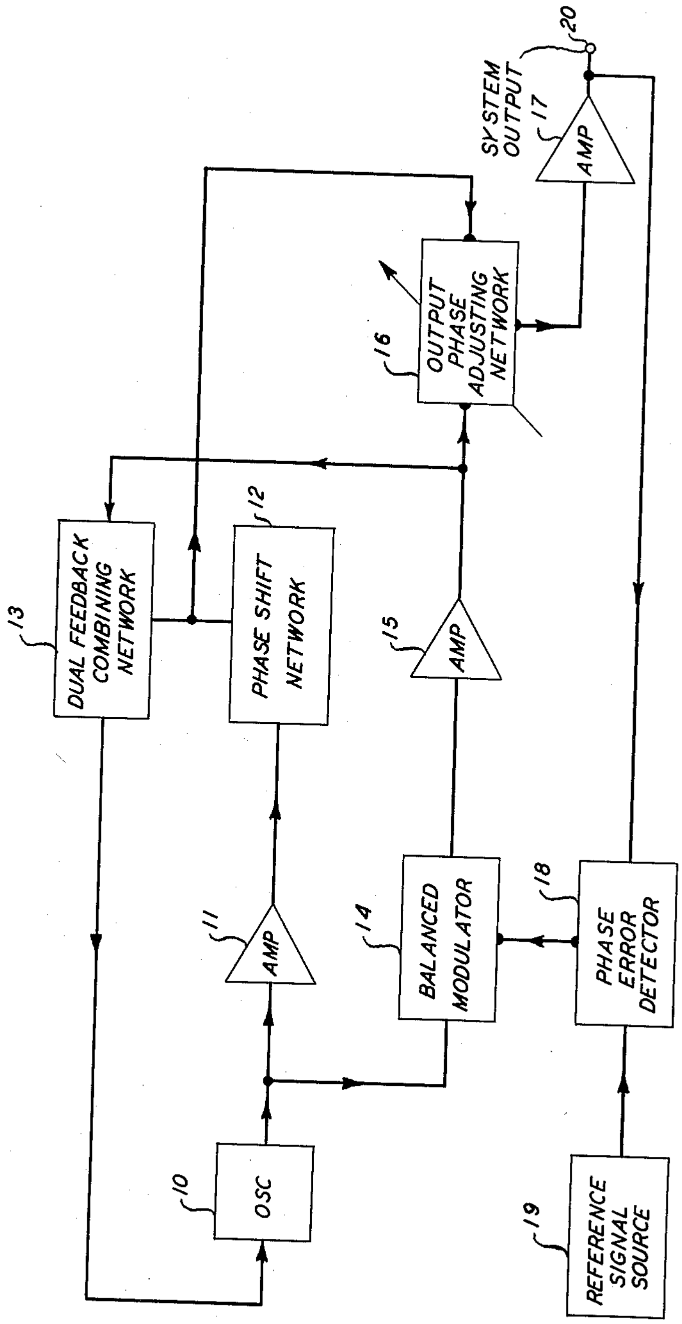

The generalized embodiment of the invention shown in FIG. 1 includes an oscillator 10 with driving force obtained by the combination of the signals in each of two feedback paths. The first or primary feedback path includes the amplifier 11 and the phase shift network 12 whose output is applied to a dual feedback combining network 13. The oscillator 10 may be driven at its resonant frequency solely by feedback obtained from the primary feedback path. For purposes of illustration, it is assumed that there is a 90° shift in phase between the input of the oscillator 10 and its output. Such a phase shift is not pertinent to the principles or features of the invention but is a typical characteristic of certain commercial electromechanical oscillators such as tuning fork resonators, for example, and is the result of the physical arrangement of the tuning fork and the driving and pick-up coils. The phase shift network 12 shifts the signal in the main feedback path by 90°, thus resulting in a total phase shift of zero around the main feedback loop, the conventional condition required to sustain oscillations at the resonant frequency. The output of the phase shift network 12 in the primary feedback path is also applied as an input to an output phase-adjusting network 16 whose output is in turn applied to an amplifier 17 which produces a final system output at output point 20.

For the moment it may be assumed that the phase-adjusting network 16 provides a direct conducting path from the output of the phase shift network 12 to the input of amplifier 17. The output of the phase-adjusting network 16 is also shown applied as one input of a phase error detector 18. The second input to phase error detector 18 is supplied by a signal from reference signal source 19. The reference signal source 19 is intended to be illustrative of any source of signals to which the output of oscillator 10 is to be synchronized. Such a source might therefore be the clock signal generator in a digital pulse transmission system. In the event that there is no phase difference between the two inputs to the phase error detector 18, no output is applied to the balanced modulator 14. In such a case the auxiliary feedback path is maintained in a disabled condition and signals are restricted to the main feedback loop and to the output circuit as described above.

In the event, however, that a difference in phase exists between the two inputs to the phase error detector 18, a direct current control signal is developed and is applied to the balanced modulator 14. The polarity and magnitude of the control signal correspond, respectively, to the sense and magnitude of the phase error detected by the detector 18. The balanced modulator 14 serves a dual purpose in that it acts as a variable impedance in accordance with the magnitude of the control signal and also operates in accordance with the polarity of the control signal to maintain the phase of the signal in the secondary feedback path at an angle which either leads or lags the phase angle of the output of the phase shift network 12 by 90°.

In the event that a control signal is applied as described, the resulting output signal of the balanced modulator 14 is amplified by amplifier 15 whose output is, in turn, applied both to the dual feedback combining network 13 and the output phase-adjusting network 16. The combination of the two feedback signals in the dual feedback combining network 13 is direct and nonselective and, accordingly, feedback applied to the input of oscillator 10 is merely the simple vector sum of the two feedback signals. The resultant change in the phase of the driving feedback signal changes the oscillator frequency until such time that the total phase shift around the main feedback loop has once again returned to zero at which point the oscillator 10 again becomes stable at a particular frequency.

The output of the output phase-adjusting network 16 has already been considered in terms of its employment as a final output signal when amplified by amplifier 17 and its employment as one of the two inputs to the phase error detector 18. It is now pertinent to consider precisely how the frequency and phase of the output signal are determined in accordance with one of the features of the invention. The output phase-adjusting network 16 includes a control which is variable in the sense that preselected portions of each of its two inputs may be combined to form the output signal. Stated otherwise, a part of each of the two feedback signals is combined in accordance with a variable preselected ratio to constitute the final output.

Consider first the case in which the network is adjusted to the point at which its output is virtually identical to the output of phase shift network 12. In such a case both the frequency and the phase of the final output signal applied to output point 20 are identical to the frequency and phase of oscillator 10, taking into account the 90° shift in phase effected by the phase shift network 12. The opposite extreme of the range of control exercised by the phase-adjusting network 16 is illustrated by the case in which the output from the phase shift network 12 is blocked or radically attenuated and the output of amplifier 15 is, in effect, applied directly as an input to amplifier 17. Once again, the frequency of the output signal necessarily coincides with the frequency of the oscillator 10. The phase of the output signal, however, no longer corresponds to the phase of the output of the phase shift network 12 but instead either leads or lags that signal by 90°. It is a feature of the invention that a phase shift of this magnitude may be applied directly and abruptly to shift the phase of the output signal over a range which approaches 180° and further that this phase change appears in the output signal even before the corresponding phase change in the combined feedback path can effect a change in the frequency or in the phase of the oscillator.

Figure 2:
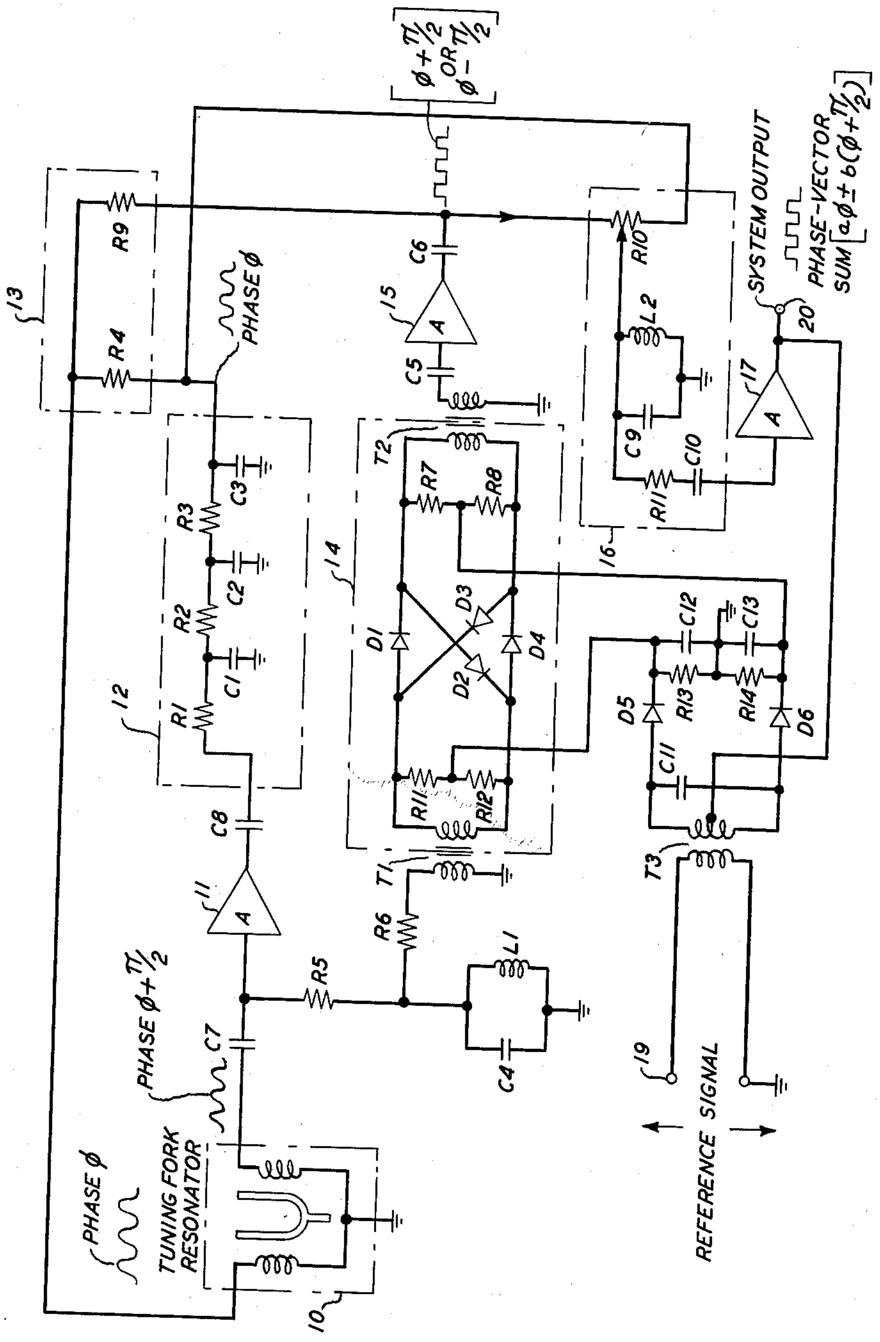
FIG. 2 is a schematic circuit diagram of the embodiment shown in FIG. 1.

The specific function and operation of the apparatus illustrated in block form in FIG. 1 may be explained in greater detail with reference to the schematic circuit diagram of the system which is shown in FIG. 2. In FIG. 2 the oscillator 10 is shown to be a tuning fork resonator. Other electromechanical resonators may be employed in the system illustrated with equal advantage. Typical characteristics of a tuning fork resonator include loose coupling to the external circuitry in which it is employed and a relatively high Q factor. Generally, such oscillators are very stable at their resonant frequency in comparison to conventional tuned circuits, for example. The range of effective frequency control is generally limited and typically may be as small as three to four hundred parts per million. Depending upon the particular application in which such a tuning fork is used, the requirements for preciseness of control may vary from a value which may be a substantial portion of the operating frequency range or which may be as exact as one part in ten million.

As indicated, the output of the tuning fork 10 is substantially sinusoidal and its phase leads the phase of the input signal by 90°. The output of the oscillator 10 is coupled to the input of amplifier 11 by coupling capacitor C7. Neither amplifier 11 nor amplifiers 15 and 17 are shown in detail inasmuch as any one of a number of wholly conventional amplifying arrangements may be employed effectively. General requirements for these amplifiers include zero phase shift, amplification in the range of 15–20 db, and the characteristic of saturating even when amplifying relatively low amplitude signals. Two-stage common emitter transistor amplifiers have proved to be satisfactory and may readily be designed to meet these requirements. Phase shift network 12 comprises resistors R1, R2, and R3 and capacitors C1, C2, and C3. Resistance and capacitance magnitudes are selected to achieve the desired 90° shift in phase and to provide proper attenuation for the level of signal desired in the combination feedback path. The output of the phase shift network 12 is applied to the input of tuning fork oscillator 10 by way of resistor R4 which together with resistor R9 constitutes the dual feedback combining network 13. In the secondary or auxiliary feedback path the output of the tuning fork resonator 10 is applied by way of resistors R5 and R6 to the primary of transformer T1. The tuned circuit consisting of capacitor C4 and inductor L1 provides low impedance to ground for all but the resonant frequency of oscillator 10 and accordingly acts as a filter for the output signal of the oscillator. Such filtering action is conventionally required with tuned fork resonators to suppress harmonics and other undesired vibrational modes.

The balanced modulator 14 which includes the phase-determining diodes D1, D2, D3, and D4, and the voltage-dividing resistors R11, R12, R7, and R8, operates in response to the direct current control signal from the phase error detector 18, which circuit is explained in detail below, to enable the auxiliary feedback path. The configuration and operation of the balanced modulator 14 is substantially conventional although its particular utilization in the embodiment shown in FIG. 2 is believed to be unique. Overall attenuation in the balanced modulator 14 is sufficient to block transmission of a signal from the secondary of transformer 1 to the input of amplifier 15 in the absence of suitable bias on the diodes D1, D2, D3, and D4, which bias is supplied by the control signal from the phase error detector 18.

Consider first the application of a control signal of positive polarity to the junction of resistors R11 and R12. Diodes D1 and D4 are biased in the forward direction and diodes D2 and D3 are biased in the reverse direction. Accordingly, the output of the tuning fork resonator 10 is applied without phase change to the input of amplifier 15 by the auxiliary feedback path which includes the balanced modulator 14, the two transformers T1 and T2 and the coupling capacitor C5. The magnitude of this signal is, in turn, determined by the magnitude of the biasing control signal from phase error detector 18. For illustrative purposes we may assume a control signal magnitude somewhat below maximum so that the output of the tuning fork resonator 10 is reduced in magnitude in its transmission through the balanced modulator 14. This signal which is applied as an input to amplifier 15 by way of coupling capacitor C5 is illustrated by the vector quantity OY in FIG. 3A. The corresponding in-phase component in the primary feedback path which appears at the junction of resistors R3 and R4 is illustrated by the vector OX. The combination of these two vectors is the resultant vector OR which, as shown, has a phase angle which leads the in-phase angle $\varphi$ by an angle $\alpha$. It is the resultant vector OR which is applied as a feedback signal to drive the tuning fork resonator 10 to a different frequency.

If the polarity of the control signal from the phase error detector 18 is negative, bias conditions on diodes D1, D2, D3, and D4 ar reversed with respect to the condition previously described and the output of tuning fork resonator 10 is accordingly shifted in phase by 180° before its application to the input of amplifier 15. This quadrature vector is shown as OY′ in FIG. 3A, and the resultant vector OR′ which lags the in-phase vector by an angle $\beta$ is formed in the manner described for the vector OR. In this case, however, the frequency of oscillator 10 is reduced rather than increased.

Figure 3C:
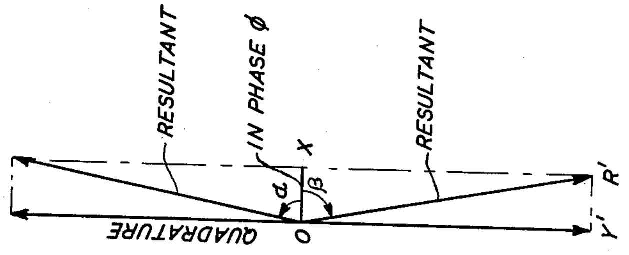
FIGS. 3A, 3B and 3C are vector diagrams of the phase relations occurring at certain key points in the system.
Figure 3B:
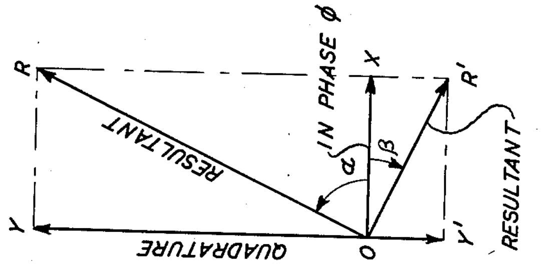

In FIG. 3B a maximum signal output from balanced modulator 14 is assumed, which output is represented by the quadrature vector OY. The corresponding resultant is the vector OR. It should be noted at this point that the magnitude of the in-phase vector OX remains constant. The application of the vector OR to the input of oscillator 10 would, of course, result in a maximum shift in oscillator frequency. It is a feature of the invention that the magnitude of the combined feedback signal or resultant vector is proportional to the difference in phase angle between that vector and the in-phase angle $\phi$. This relation meets the requirement of a tuned fork resonator which calls for an increase in driving power for off-resonant frequencies which is proportional to the magnitude of the departure from resonance. The precise quantitative frequency change which results from a particular out-of-phase vector in the combined feedback path is, of course, dependent upon the characteristics of the oscillator. The relation is substantially linear, however, over a significant portion of the oscillator's frequency range.

Again with reference to FIG. 3B, the quadrature vector OY′ is illustrative of a rather small phase difference between the reference signal and the oscillator system output and the resultant vector OR′ is correspondingly small. Again, however, the in-phase vector OX remains constant, thereby imposing a limitation on the size of the resultant vector OR′ and upon the magnitude of the angles $\alpha$ and $\beta$.

Figure 3A:
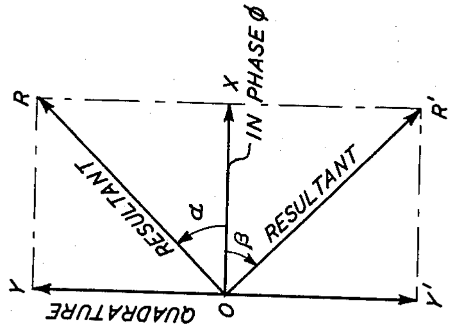

The combination of the two feedback signals which is effected in the output phase-adjusting network 16 is quite different from that which is effected, as described, in the dual feedback combining network 13. The difference stems in part from the employment of the variable resistor R10 which provides a means for combining the two signals in accordance with a preselected ratio depending on the position of the tap 23. The phase-adjusting network 16 may be used to combine the two feedback signals in a manner similar to that which is illustrated by FIG. 3A. Additionally, however, the magnitude of the in-phase vector may be in direct proportion to the increment by which the out-of-phase or quadrature vector may be increased. This situation is illustrated in FIG. 3C. With the tap 23 located at or near the upper terminal of resistor R10, the magnitude of the in-phase vector which is applied from the junction of resistors R3 and R4 to the lower terminal of variable resistor R10 is very markedly reduced and its effect on the resultant vector OR is correspondingly small. From the tap 23 the combined signal is applied by resistor R11 and capacitor C10 to the input of amplifier 17 and thence to the system output point 20. The tuned circuit consisting of capacitor C9 and inductor L2 performs the same filtering function as that described for the tuned circuit consisting of capacitor C4 and inductor L1.

At this point it is important to note that the phase of the angle which is applied to the system output point 20 is necessarily identical to the phase represented by the vector OR or the vector OR′ of FIG. 3C and further that the output signal is made to assume this phase instantaneously. As a result of the inherent inertia and damping effects which are typically found in a tuned fork resonator, the shift in the phase of the system output necessarily occurs before the tuning fork resonator 10 has changed frequency in response to the shift in phase of the feedback signal. As a result, if departures from coincidence between the reference signal and the system output of the oscillator are primarily caused by phase errors, the tap 23 may be set at the limit of its upper terminal, which serves to correct the phase error abruptly. The feedback or servo-loop function performed by the control signal from the phase error detector 18 immediately blocks transmission in the auxiliary feedback path and consequently, coincidence between the reference signal and the oscillator system output is achieved directly, with virtually no hunting effect.

In a particular system, lack of coincidence or synchronization may frequently be the result of a relatively fixed combination of frequency drift and phase shift. Over a period of time, the average ratio of the contributions of each of these errors may readily be determined. In accordance with the principles of the invention this ratio may then be employed to determine the setting of the variable resistor 10, thus enhancing both speed and stability in the synchronizing process.

With reference again to FIG. 2, the output of amplifier 17 is also applied as an input to the phase error detector 18 which includes capacitors C11, C12, and C13, and rectifying diodes D5 and D6. By way of transformer T3 a reference signal from the source 19 is also applied as an input to the phase error detector 18. The configuration and operation of the phase error detector is substantially conventional and its output which occurs at the junction of resistor R13 and capacitor C12 is simply a direct current signal whose magnitude is indicative of the magnitude of the phase difference between the two input signals and whose polarity is indicative of the sense or direction of that phase difference.

The composition of the final output of the system appearing at output point 20 has already been discussed in terms of vector quantities. Its composition may also be viewed in terms of waveforms. The combination which occurs at the tap 23 of variable resistor R10 is the addition of the output of amplifier 15, which for maximum signal input may be a square wave, to the sinusoidal signal from the main feedback path. The resulting waveform may therefore be complex. However, the limiting action of amplifier 17 in combination with the filtering action of capacitor C9 and inductor L2 produces a simple square wave output at the oscillator frequency with a phase angle that may be defined by the expression $$\left[a\varphi+b\left(\varphi\pm\frac{\pi}{2}\right)\right]$$

where $\phi$ is the phase of the oscillator input at its resonant frequency, and where $a$ and $b$ are parameters proportional to the setting of the variable resistor R10. This relation is substantially linear over a significant portion of the range of adjustment.

The foregoing embodiment is merely illustrative of the principles of the invention. Numerous other arrangements may be designed by persons skilled in the art without departing from the spirit and scope of the invention.

What is claimed is:

1. An oscillator synchronizing system including an oscillator and a source of reference signals, comprising, in combination, first circuit means providing a first feedback signal for driving said oscillator at its resonant frequency, second circuit means in parallel relation to said first circuit means for combining a second feedback signal with said first feedback signal in qudrature phase relation thereto for driving said oscillator at a nonresonant frequency, means for selectively combining a preassigned part of said first feedback signal with a preassigned part of said second feedback signal to constitute a final output signal, and means responsive to a phase difference between said reference signal and said final output signal for enabling said second feedback means and for determining the magnitude of said second feedback signal and the sense of said quadrature relation in accordance with the sense and magnitude, respectively, of said phase difference, whereby the phase of said final output signal may be shifted abruptly into coincidence with the phase of said reference signal substantially independent of changes in the frequency of said oscillator.

2. Apparatus in accordance with claim 1 wherein said output signal means comprises a variable resistor including first and second terminal points and a tap, and means for applying said first and second feedback signals to said first and second terminal points, respectively, whereby said output signal is derived at said tap.

3. Apparatus in accordance with claim 2 wherein each of said circuit means includes a respective amplifier.

4. An oscillator synchronizing system including an oscillator and a source of reference signals, comprising, in combination, first circuit means providing a first feedback signal for driving said oscillator at its resonant frequency, second circuit means in parallel relation to said first circuit means for combining a second feedback signal with said first feedback signal in quadrature phase relation thereto for driving said oscillator at a non-resonant frequency, means for combining a preselected part of said first feedback signal with a preselected part of said second feedback signal in accordance with a variable preassigned ratio to constitute a final output signal having a phase angle which differs from the phase angle of said first and second feedback signals in accordance with said preassigned ratio, means responsive to a phase difference between said reference signal and said final output signal for generating a control signal with polarity and magnitude indicative of the sense and magnitude, respectively, of said phase difference, and means responsive to said control signal for enabling said second circuit means and for determining the direction of said quadrature relation and the magnitude of said second feedback signal in accordance with the polarity and magnitude, respectively, of said control signal, whereby the phase of said final output signal may be shifted abruptly into coincidence with the phase of said reference signal substantially independent of changes in the frequency of said oscillator.

5. Apparatus in accordance with claim 4 wherein each of said circuit means includes a respective amplifier.

6. Apparatus in accordance with claim 4 wherein said enabling means comprises a balanced modulator.

7. Apparatus in accordance with claim 4 wherein said oscillator comprises a tuning fork resonator.

8. Apparatus in accordance with claim 4 wherein said output signal means comprises a variable resistor including first and second terminal points and a tap, and means for applying said first and second feedback signals to said first and second terminal points, respectively, whereby said output signal is derived at said tap.

9. An oscillator synchronizing system including a tuning fork resonator having an input point and an output point and a source of reference signals comprising, in combination, first circuit means for applying a first feedback signal from said output point to said input point thereby to drive said tuning fork at its resonant frequency, second circuit means in parallel relation to said first circuit means for combining a second feedback signal with said first feedback signal in quadrature phase relation thereto thereby to change the oscillating frequency of said tuning fork, means jointly responsive to a preselected part of said first feedback signal and to a preselected part of said second feedback signal for developing a system output signal having a variable phase angle equivalent to the vector resultant of said preselected parts, said parts being selected in accordance with a predetermined ratio, and means responsive to a phase difference between said reference signal and said final output signal for enabling said second circuit means and for determining the magnitude of said second feedback signal and the sense of said quadrature relation in accordance with the direction and magnitude, respectively, of said phase difference, whereby the phase of said final output signal may be shifted abruptly over a range approaching 180° irrespective of the time required to effect a change in the oscillating frequency of said tuning fork after the application of a combined feedback signal to said input point.

10. Apparatus in accordance with claim 9 wherein at the resonant frequency of said tuning fork the signals at said input and output points are in quadrature phase relation and wherein said first circuit means includes a phase shifting network.

11. Apparatus in accordance with claim 9 wherein said second circuit means includes a balanced modulator.

12. Apparatus in accordance with claim 9 wherein said output signal means comprises a variable resistor including first and second terminal points and a tap, and means for applying said first and second feedback signals to said first and second terminal points, respectively, whereby said output signal is derived at said tap.

13. Apparatus in accordance with claim 11 wherein each of said circuit means includes a respective amplifier.

No references cited.